(12) United States Patent
Wang et al.

(10) Patent No.: US 11,734,511 B1
(45) Date of Patent: Aug. 22, 2023

(54) MAPPING DATA SET(S) TO CANONICAL PHRASES USING NATURAL LANGUAGE PROCESSING MODEL(S)

(71) Applicant: Mineral Earth Sciences LLC, Mountain View, CA (US)

(72) Inventors: Nanzhu Wang, San Jose, CA (US); Gaoxiang Chen, Mountain View, CA (US); Yueqi Li, San Jose, CA (US)

(73) Assignee: MINERAL EARTH SCIENCES LLC, Mountain View, CA (US)

( * ) Notice: Subject to any disclaimer, the term of this patent is extended or adjusted under 35 U.S.C. 154(b) by 194 days.

(21) Appl. No.: 16/946,840

(22) Filed: Jul. 8, 2020

(51) Int. Cl.
*G06F 40/289* (2020.01)
*G06N 3/044* (2023.01)

(52) U.S. Cl.
CPC ............... *G06F 40/289* (2020.01); *G06N 3/044* (2023.01)

(58) Field of Classification Search
CPC .......... G06N 3/0445; G06F 40/289; G06F 16/90324; G06F 3/0482; G06F 16/2455; G06F 16/22; G06F 16/313; G06F 16/34; G06F 16/9035; G06F 40/00; G06F 40/151; G06F 40/166; G06F 40/211; G06F 40/295; G06F 40/30; G06F 40/40; G06F 40/279; G06F 40/247; G06F 40/253; G06F 40/268; G06F 40/47; G06F 40/205; G06F 40/216; G06F 40/284; G06F 40/103; G06F 40/117; G06F 40/194; G06F 40/232; G06F 40/242; G06F 40/42; G06F 16/3329; G06F 16/35; G06F 16/3344; G06F 18/22; G06F 16/9024; G06F 16/243; G06F 16/90344; G06F 18/214; G06F 40/126; G06F 40/56; G06F 40/58; G06F 16/2282; G06F 16/24524; G06F 16/3346; G06F 16/345; G06F 16/36; G06F 16/93; G06F 16/9558; G06F 17/18; G06F 18/25; G06F 16/212; G06F 16/2237; G06F 16/2433; G06F 16/283; G06F 16/284; G06F 16/288; G06F 16/316; G06F 16/332; G06F 16/3331; G06F 16/335; G06F 16/338; G06F 16/353; G06F 16/9535; G06F 16/9536; G06F 16/9538; G06F 18/213; G06F 18/2163; G06F 18/24; G06F 18/241; G06F 18/2415; G06F 18/253; G06F 16/367
See application file for complete search history.

(56) References Cited

U.S. PATENT DOCUMENTS

| | | | | |
|---|---|---|---|---|
| 7,672,832 B2 * | 3/2010 | Huang et al. | ........ | G06F 40/289 704/9 |
| 7,865,352 B2 * | 1/2011 | Suzuki et al. | ........ | G06F 40/289 704/7 |

(Continued)

OTHER PUBLICATIONS

Zhang, J.; Segmented Graph-Bert for Graph Instance Modeling; 10 pages; dated Feb. 9, 2020.

(Continued)

*Primary Examiner* — Abdelali Serrou
(74) *Attorney, Agent, or Firm* — Gray Ice Higdon

(57) ABSTRACT

Techniques are disclosed that enable generating a unified data set by mapping a set of item description phrases, describing entries in a data set, to a set of canonical phrases. Various implementations include generating a similarity measure between each item description phrase and each canonical phrase by processing the corresponding item description phrase and the corresponding canonical phrase using a natural language processing model. Additional or alternative implementations include generating a bipartite graph based on the set of item description phrases, the set of canonical phrases, and the similarity measures. The mapping can be generated based on the bipartite graph.

14 Claims, 6 Drawing Sheets

(56) References Cited

U.S. PATENT DOCUMENTS

| | | | | |
|---|---|---|---|---|
| 8,386,232 | B2* | 2/2013 | Peng | G06F 40/53 600/513 |
| 9,031,895 | B2* | 5/2015 | Schon | G06F 16/24564 706/48 |
| 9,141,602 | B2* | 9/2015 | White et al. | G06F 40/274 |
| 2006/0253476 | A1* | 11/2006 | Roth et al. | G06F 40/12 |
| 2011/0225173 | A1* | 9/2011 | Gulhane et al. | G06V 30/268 707/E17.069 |
| 2016/0041961 | A1* | 2/2016 | Romney | G06F 40/106 715/230 |
| 2016/0300573 | A1* | 10/2016 | Carbune et al. | G10L 17/22 |
| 2018/0365321 | A1* | 12/2018 | Ke et al. | G06F 40/103 |
| 2021/0279551 | A1* | 9/2021 | Hashimoto et al. | G06F 40/216 |
| 2021/0303784 | A1* | 9/2021 | Brdiczka et al. | H04L 51/04 |

OTHER PUBLICATIONS

Zhang, Jiawei et al.; Graph-Bert; Only Attention is Needed for Learning Graph Representations; 10 pages; dated Jan. 22, 2020.

Zhang, Muhan et al.; An End-to-End Deep Learning Architecture for Graph Classification; The Thirty-Second AAAI Conference on Artificial Intelligence; Pages 4438-4445; dated 2018.

* cited by examiner

MAPPING DATA SET(S) TO CANONICAL PHRASES USING NATURAL LANGUAGE PROCESSING MODEL(S)

BACKGROUND

As agricultural data mining and planning becomes more commonplace, the amount of data analyzed, and the number of sources providing that data, is increasing rapidly. In many cases these sources, such as individual farms, farming cooperatives ("co-ops"), and other agricultural entities such government agencies and commercial enterprises, may provide the same data, such as seeds planted per acre, amount of fertilizer X applied each week, amount of irrigation, amount of pesticide applied, etc. However, the item description phrases used to describe these disparate data may vary widely from source to source. Consequently, unifying/normalizing agricultural data from multiple different sources for purposes such as crop yield prediction and/or diagnoses can be complicated, and often involves significant human intervention (and hence, investment and/or costs), e.g., using manually created templates, etc.

SUMMARY

Techniques disclosed herein are directed towards automatically mapping set of item description phrases, describing items in a data set, to a set of canonical phrases. In some implementations, the set of item description phrases and the set of canonical phrases can be processed using a natural language processing ("NLP") model to generate a similarity measure between each item description phrase and each canonical phrase. In some implementations, the NLP model can be a transformer model. In some of those implementations, the transformer model can be a bidirectional encoder representations from transformers ("BERT") model.

In some implementations, a graph can be generated based on (a) the set of item description phrases, (b) the set of canonical phrases, and (c) the similarity measures. In some implementations, the graph representation can be a bipartite graph. The mapping between the set of item description phrases and the set of canonical phrases can be generated by optimizing the graph. For example, both the item description phrase of 'seeds/acre' in a first agricultural data set, and the item description phrase of "seeds per acre" in a second agricultural data set, can be mapped to a canonical phrase of 'seeds_per_acre'. Similarly, both the item description phrase of 'area' in a first agricultural data set and the item description phrase of 'seeds per area' in a second agricultural data set can be mapped to the canonical phrase of 'seeds_area'. In other words, techniques described herein can be used to combine multiple data sets, where items are described in the data sets using different phrases, into a unified data set where items are described using canonical phrases.

Accordingly, various implementations set forth techniques for automatically mapping one or more sets of item description phrases to a set of canonical phrases based on a bipartite graph. In some implementations, the bipartite graph can be generated based on the set of item description phrases, the set of canonical phrases, and a set of similarity measures generated by processing the item description phrases and the canonical phrases using a NLP model. This enables automatically mapping a set of item description phrases to a set of canonical phrases. In contrast, conventional techniques require manually mapping each item description phrase to each canonical phrase (e.g. manually generating a template mapping from the set of item description phrases and the set of canonical phrases). Computing resources (e.g., processor cycles, memory, battery power, etc.) can be conserved by automatically generating the mapping, thus eliminating need to transmit the data from remote computing system to a human reviewer, for the human reviewer to generate the mapping, and to transmit the mapping from the human reviewer back to the remote computing system.

The above description is provided only as an overview of some implementations disclosed herein. These and other implementations of the technology are disclosed in additional detail below.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
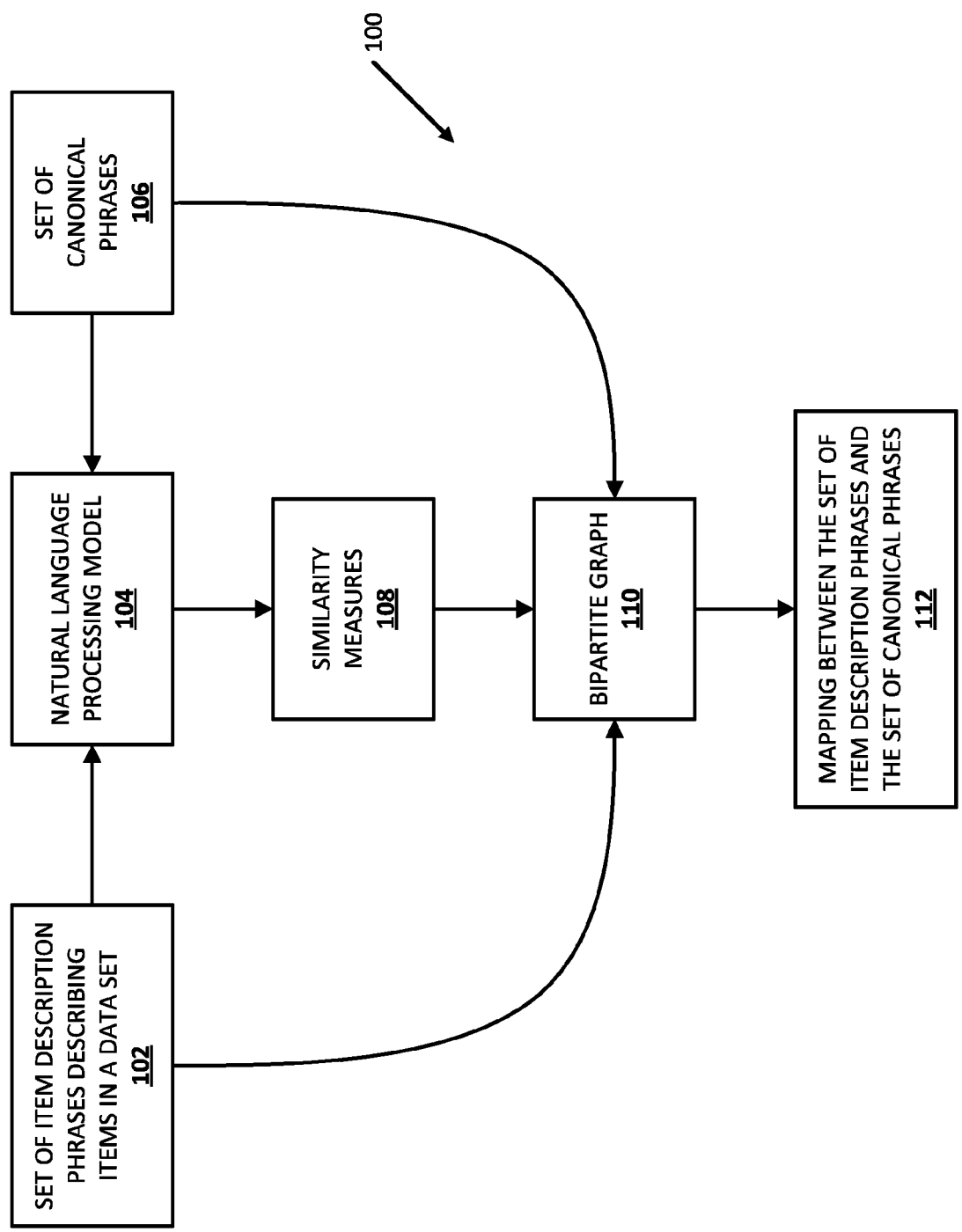
FIG. 1 illustrates an example of generating a mapping between a set of item description phrases and a set of canonical phrases in accordance with various implementations disclosed herein.

FIG. 1 illustrates an example of generating a mapping between a set of item description phrases and canonical phrases in accordance with various implementations disclosed herein. Example 100 includes a set of item description phrases 102 describing items in a data set. In some implementations, an item description phrase can describe the type of information included in a variable. For example, an item description phrase of 'rainfall' can describe a value in a dataset indicating the amount of rainfall recorded for the area. As an additional example, the item description phrase of 'seeds/acre' can describe a value in a dataset indicating the number of seeds planted per acre of a field. In some implementations, each item in the data set can be described by one of the item description phrases in the set of item description phrases. Additionally or alternatively, in some implementations, each item in the set of item description phrases can be described by two or more item description phrases, in the set of item description phrases. Different data sets can be described using different corresponding sets of item description phrases. Example 100 further includes a set of canonical phrases 106. In some implementations, the set of canonical phrases can be a way of describing values in a unified data set. The set of item description phrases 102 can be mapped to the set of canonical phrases 106. In some implementations, multiple data sets with corresponding sets of item description phrases can be mapped to the same set of canonical phrases, which can enable combining the different data sets into a unified data set.

The set of item description phrases 102 and the set of canonical phrases 106 can be processed using a natural language processing (NLP) model 104, to generate similarity measures 108. NLP model 104 can include a variety of natural language models including a recurrent neural network (RNN) model, a bidirectional long short-term memory network, a transformer model, a bidirectional encoder representations from transformer (BERT) model, one or more additional or alternative models, and/or a combination thereof. In some implementations the similarity measures 108 can include a similarity measure between each item description phrase and each canonical phrase. A similarity measure 108 can provide an indication of the similarity between the corresponding item description phrase and canonical phrase. For example, a similarity measure can have a value ranging from 0 to 1, where a value of 0 can indicate very dissimilar phrases and a value of 1 can indicate similar phrases (e.g., identical phrases). Similarity measures can have additional and/or alternative values (e.g., negative values, values over 1, etc.).

Bipartite graph 110 can be generated based on (a) the set of item description phrases 102, (b) the set of canonical phrases 106, and (c) the similarity measures 108. For example, bipartite graph 110 can include a first set of vertices including a vertex corresponding to each item description phrase in the set of item description phrases 102, a second set of vertices including a vertex corresponding to each canonical phrase in the set of canonical phrases 106, and an edge connecting each vertex in the first set of vertices with each vertex in the second set of vertices. In some implementations, an edge between a vertex representing an item description phrase and a vertex representing a canonical phrase can have a value corresponding to the similarity measure between the item description phrase and the canonical phrase.

A mapping 112 between the set of item description phrases 102 and the set of canonical phrases 106 can be generated based on bipartite graph 110. In some implementations, the mapping can be generated by optimizing the bipartite graph 110. For example, the bipartite graph 110 can be globally optimized using bipartite graph perfect matching, a Hungarian algorithm, a Hopcroft-Karp Algorithm, and/or one or more additional or alternative graph optimization algorithms.

Figure 2:
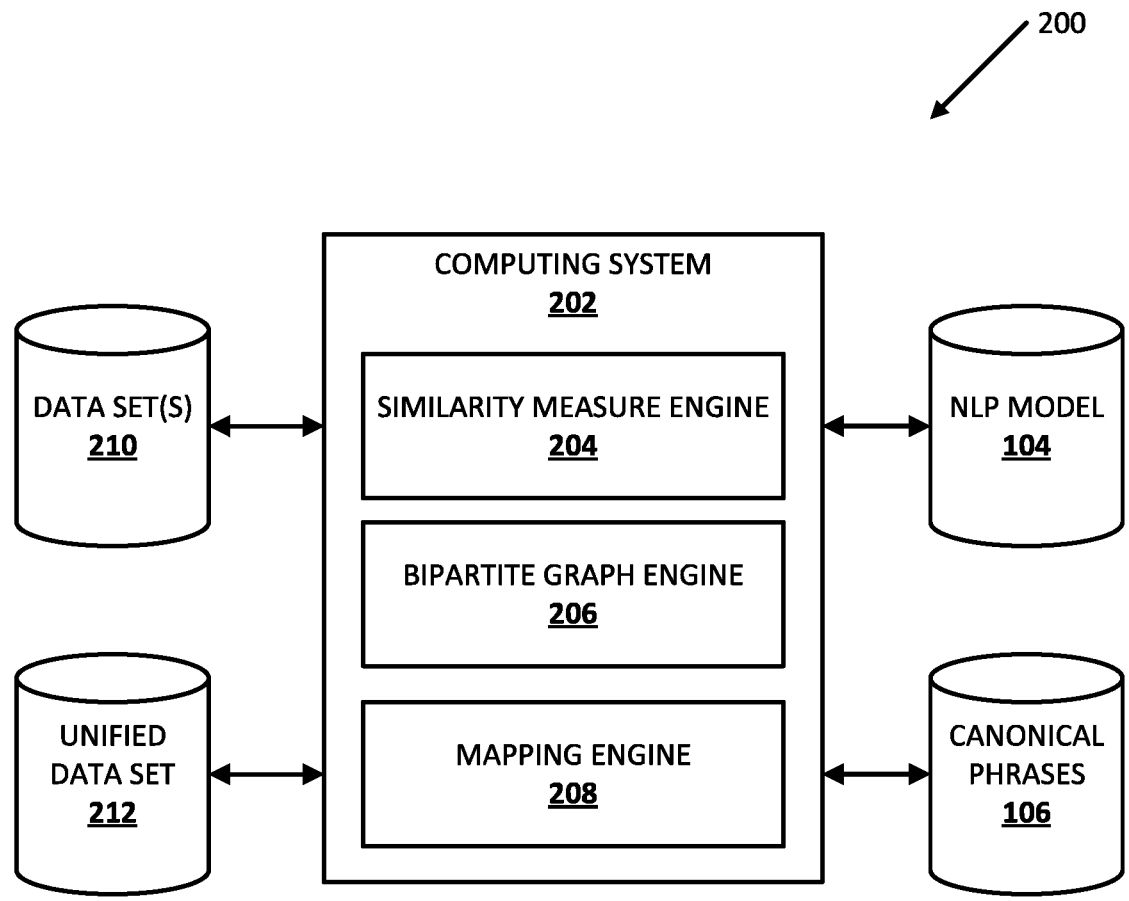
FIG. 2 illustrates an example environment in which various implementations disclosed herein may be implemented.

FIG. 2 illustrates a block diagram of an example environment 200 in which implementations disclosed herein may be implemented. The example environment 200 includes a computing system 202 which can include similarity measure engine 204, bipartite graph engine 206, mapping engine 208, and/or one or more additional or alternative engine(s) (not depicted). Additionally or alternatively, computing system 202 may be associated with NLP model 104, one or more sets of canonical phrases 106, one or more data sets 210, one or more unified data sets 212, and/or one or more additional or alternative components (not depicted).

In some implementations, computing system 202 may include user interface input/output devices (not depicted), which may include, for example, a physical keyboard, a touch screen (e.g., implementing a virtual keyboard or other textual input mechanisms), a microphone, a camera, a display screen, and/or speaker(s). The user interface input/output devices may be incorporated with one or more computing system 202 of a user. For example, a mobile phone of the user may include the user interface input output devices; a standalone digital assistant hardware device may include the user interface input/output device; a first computing device may include the user interface input device(s) and a separate computing device may include the user interface output device(s); etc. In some implementations, all or aspects of computing system 202 may be implemented on a computing system that also contains the user interface input/output devices.

Some non-limiting examples of computing system 202 include one or more of: a desktop computing device, a laptop computing device, a standalone hardware device at least in part dedicated to an automated assistant, a tablet computing device, a mobile phone computing device, a computing device of a vehicle (e.g., an in-vehicle communications system, an in-vehicle entertainment system, an in-vehicle navigation system, an in-vehicle navigation system), or a wearable apparatus of the user that includes a computing device (e.g., a watch of the user having a computing device, glasses of the user having a computing device, a virtual or augmented reality computing device). Additional and/or alternative computing systems may be provided. Computing system 202 may include one or more memories for storage of data and software applications, one or more processors for accessing data and executing applications, and other components that facilitate communication over a network. The operations performed by computing system 202 may be distributed across multiple computing devices. For example, computing programs running on one or more computers in one or more locations can be coupled to each other through a network.

As illustrated in FIG. 2, similarity measure engine 204 can be used to generate one or more similarity measures (108 in FIG. 1) between item description phrases included in data set(s) 210 and canonical phrases in a set of canonical phrases 106. In some implementations, similarity measure engine 204 can generate a similarity measure by processing an item description phrase and a canonical phrase using NLP model 104. NLP model 104 can include a variety of natural language processing models including a recurrent neural network (RNN) model, a bi-directional long short-term memory network a transformer model, a bidirectional encoder representations from transformer (BERT) model, one or more additional or alternative models, and/or a combination thereof. In some implementations, similarity measure engine 204 can be used to process the set of item description phrases and the set of canonical phrases, using NLP model 104, to generate a similarity measure between each of the item description phrases and each of the canonical phrases.

In some implementations, bipartite graph engine 206 can be used to generate a bipartite graph, such as bipartite graph 110 of FIG. 1 and/or bipartite graph 300 of FIG. 3. In some implementations, the bipartite graph can include a vertex corresponding to each item description phrase in the set of item description phrases and a vertex corresponding to each canonical phrase in the set of canonical phrases 106, with an edge connecting each item description phrase vertex with each of the canonical phrase vertices. In some implementations, an edge between an item description phrase vertex and a canonical phrase vertex can have a value corresponding to the similarity measure between the item description phrase and the canonical phrase (e.g., the similarity measure generated using similarity measure engine 204).

Mapping engine 208 can be used to generate a mapping between a set of item description phrases of data set 210 and the set of canonical phrases 106. In some implementations, the mapping can be generated by optimizing the bipartite graph generated using bipartite graph engine 206. For example, the mapping can be implemented by globally optimizing the bipartite graph using, for example a bipartite graph perfect match process, the Hopcroft-Karp algorithm, the Hungarian algorithm, one or more additional or alternative graph optimization processes, and/or combinations thereof.

In some implementations, the system can present the mapping between a set of item description phrases and a set of canonical phrases, generated using mapping engine 208, to a human reviewer to review the generated mapping. For example, the system can present a candidate mapping to a human reviewer where the candidate mapping satisfied one or more conditions, such as the candidate mapping falling below a threshold confidence value. In some of those implementations, the human reviewer can confirm the candidate mapping, can suggest an alternate mapping, can determine the item description phrase does not have a corresponding canonical phrase and can add the item decryption phrase to the set of canonical phrases, and/or perform additional and/or alternative actions based on the candidate mapping.

Additionally or alternatively, mapping engine 208 can be used to generate unified data set 212 based on the mappings between the set of item description phrases of data set 210 and the set of canonical phrases 106. In some implementations, the unified data set 212 can include multiple different data sets 210, where the set of item description phrases corresponding to each data set is mapped to the same set of canonical phrases 106. In other words, unified data set 212 can include information found in different data sets, where the same value is described using different item description phrases, by mapping each of the item description phrases to the same canonical phrase. For example, the item description phrase of 'per acre seeds' of a first data set can be mapped to a canonical phrase of 'seeds_per_acre'. Similarly, the item description phrase of 'seeds/acre' can be mapped to the canonical phrase of 'seeds_per_acre'. The unified data set can include information from the first data set and information from the second data set mapped to the canonical phrase of 'seeds_per_acre'.

Figure 3A:
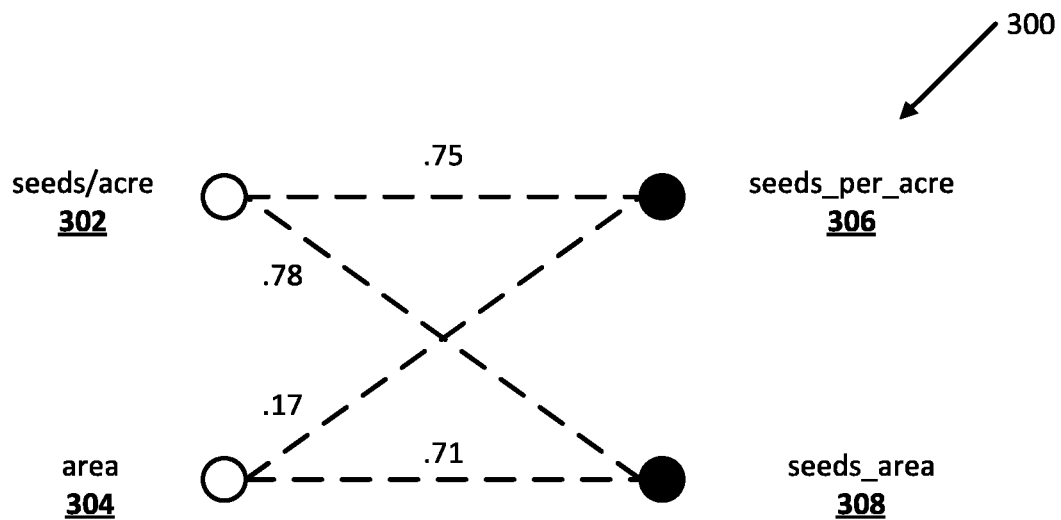
FIG. 3A illustrates an example of a bipartite graph in accordance with various implementations disclosed herein.

FIG. 3A illustrates an example bipartite graph 300. Bipartite graph 300 includes vertices representing a set of item description phrases of 'seeds/acre' 302 and 'area' 304 and vertices representing a set of canonical phrases of 'seeds_per_acre' 306 and 'seeds_area' 308. Dotted lines can represent edges between the item description phrases and the canonical phrases. Bipartite graph 300 includes an edge between: 'seeds/acre' 302 and 'seeds_per_acre' 306; an edge between 'seed/acre' 302 and 'seeds_area' 308; an edge between 'area' 304 and 'seeds_per_acre' 306; and an edge between 'area' 304 and 'seeds_area' 308. In some implementations, a similarity measure can be generated by processing, using an NLP model, an item description phrase and a canonical phrase, where the similarity measure can indicate how similar (or dissimilar) the item description phrase is to the canonical phrase. For example, in bipartite graph 300, the similarity measure between 'seeds/acre' 302 and 'seeds_per_acre' 306 is 0.75; the similarity measure between 'seeds/acre' 302 and 'seeds_area' 308 is 0.78; the similarity measure between 'area' 304 and 'seeds_per_acre' 306 is 0.17; and the similarity measure between 'area' 304 and 'seeds_area' 308 is 0.71.

Figure 3B:
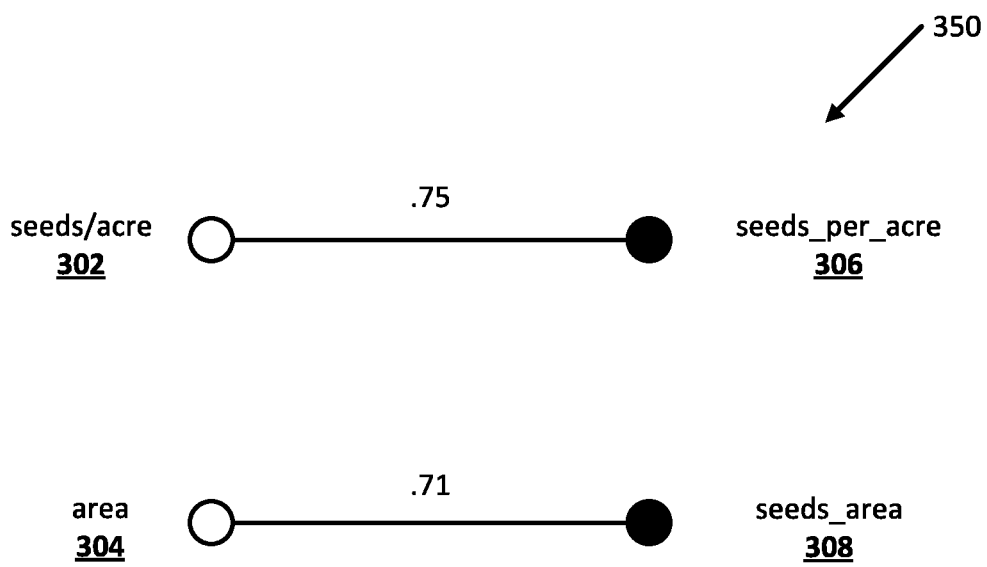
FIG. 3B illustrates an example of an optimized bipartite graph in accordance with various implementations disclosed herein.

FIG. 3B illustrates an optimized bipartite graph 350. In some implementations, optimized bipartite graph 350 can be generated based on bipartite graph 300 of FIG. 3A. In the illustrated example, optimized bipartite graph 350 is globally optimized, with 'seeds' acre 302 mapped to 'seeds_per_acre' with a similarity measure of 0.75 and 'area' 304 mapped to 'seeds_area' with a similarity measure of 0.71. However, the global optimization is not meant to be limiting. In some implementations, additional or alternative optimization schemes may be utilized, such as local optimization.

Figure 4:
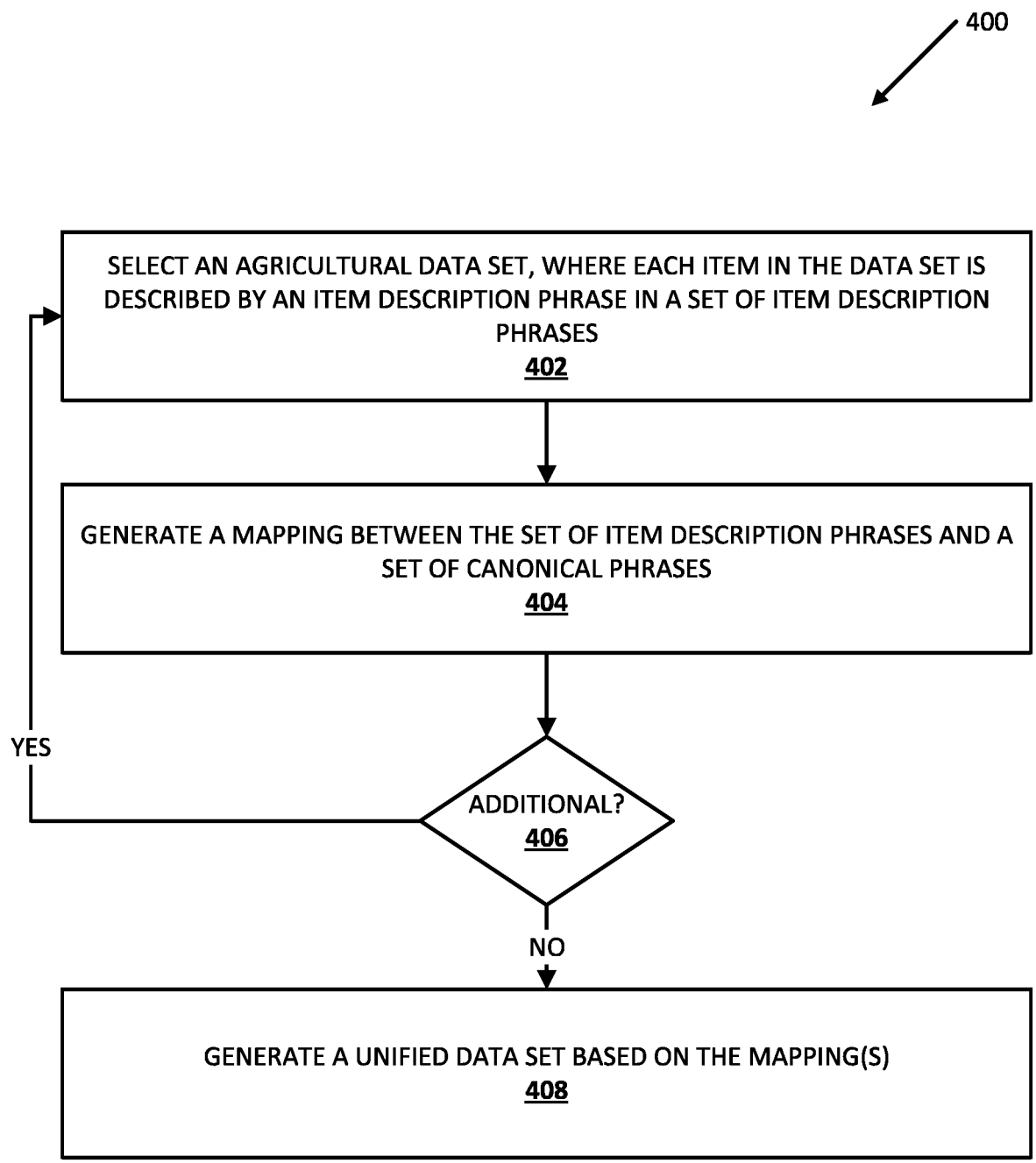
FIG. 4 is a flowchart illustrating an example process of generating a unified data set in accordance with various implementations disclosed herein.

FIG. 4 is a flowchart illustrating an example process 400 of generating a unified data set in accordance with implementations disclosed herein. For convenience, the operations of the flowchart are described with reference to a system that performs the operations. This system may include various components of various computer systems, such as one or more components of computing system 202, and/or computing system 610. Moreover, while operations of process 400 are shown in a particular order, this is not meant to be limiting. One or more operations may be reordered, omitted, and/or added.

At block 402, the system selects an agricultural data set, where each item in the data set is described by an item description phrase in a set of item description phrases. In some implementations, the agricultural data set can be a data set provided by a third party. For example, the agricultural data set can be a third party data set provided by a farmer, an agricultural corporation, a university, and/or another third party generating agricultural data. In some implementations, the agricultural data set can include a set of item description phrases used to describe values in the data set. For example, the agricultural data set can include a set of item description phrases of 'rainfall', 'seeds/acre', and 'planting date' indicating the recorded precipitation, the number of seeds planted per acre, and the date seeds were planted respectively.

At block 404, the system generates a mapping between the set of item description phrases and a set of canonical phrases. In some implementations, the mapping between the set of item description phrases and the set of canonical phrases can be generated using process 500 of FIG. 5 described herein.

At block 406, the system determines whether to process any additional agricultural data sets. For example, the system can determine whether one or more conditions are satisfied, such as whether every agricultural data set has been processed, whether a threshold number of agricultural data sets have been processed, and/or whether additional or alternative condition(s) have been satisfied. If the system determines to process an additional agricultural data set, the system proceeds back to block 402, selects an additional agricultural data set, and proceeds to block 404 to generate a mapping between an additional set of item description phrases and the set of canonical phrases based on the additional selected agricultural data set. If not, the system determines to not process any additional agricultural data set(s), the system proceeds to block 408.

At block 408, the system generates a unified data set based on the mapping(s). In some implementations, the unified data set can include data from several agricultural data sets, where item description phrases of each of the agricultural data sets can be mapped to the same set of canonical phrases. For example, a first data set can include an item description phrase 'date' and a second data set can include an item description phrase 'planting date'. In some implementations, the item description phrase 'date' and the item description phrase 'planting date' can both be mapped to the same canonical phrase 'planting_date'. A unified data set can be generated by mapping multiple data sets, with different corresponding sets of item description phrases, to the same set of canonical phrases.

Figure 5:
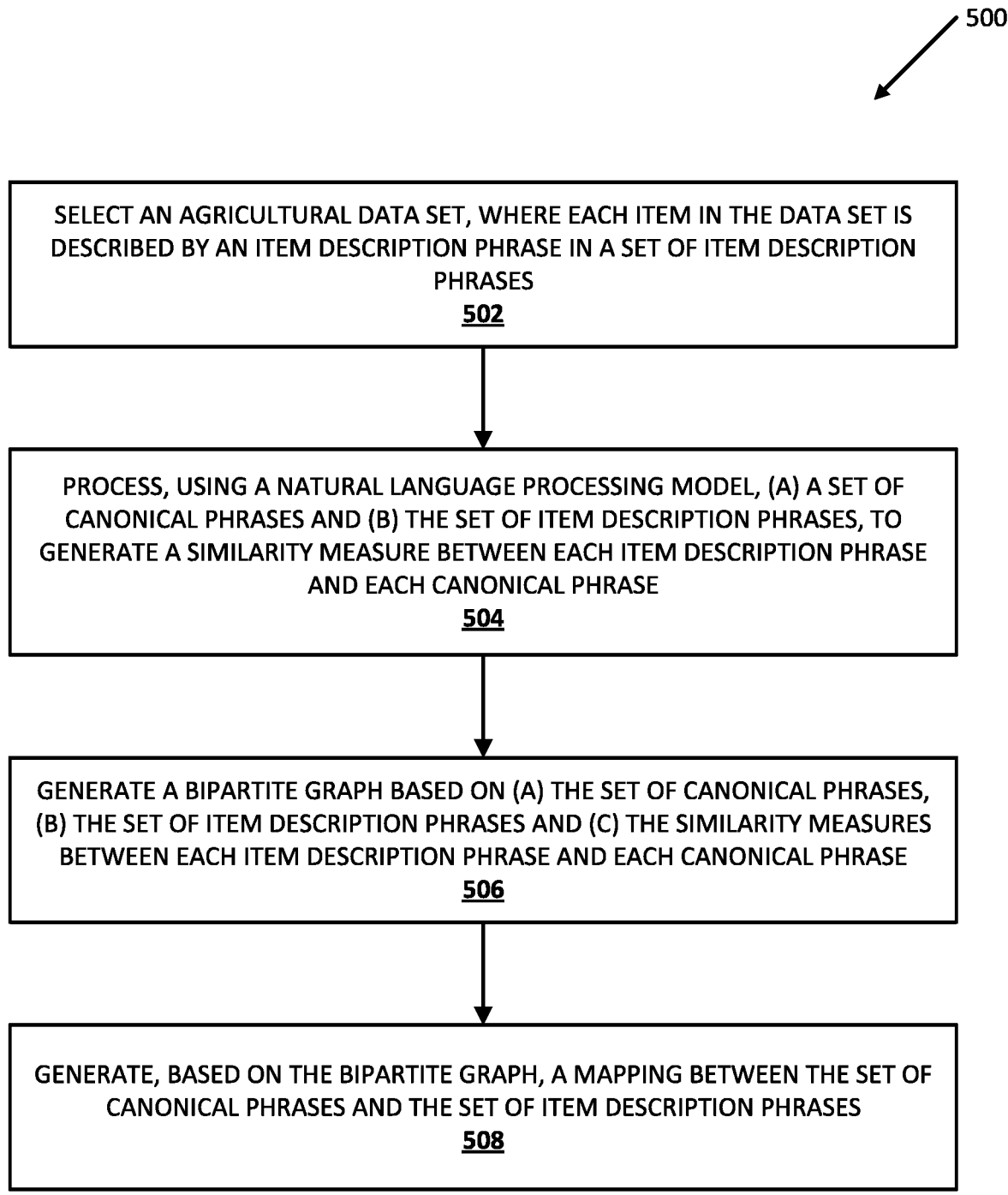
FIG. 5 is a flowchart illustrating an example process of generating a mapping between a set of item description phrases and canonical phrases in accordance with various implementations disclosed herein.

FIG. 5 is a flowchart illustrating an example process 500 of generating a mapping between a set of item description phrases and canonical phrases in accordance with implementations disclosed herein. For convenience, the operations of the flowchart are described with reference to a system that performs the operations. This system may include various components of various computer systems, such as one or more components of computing system 202, and/or computing system 610. Moreover, while operations of process 500 are shown in a particular order, this is not meant to be limiting. One or more operations may be reordered, omitted, and/or added.

At block 502, the system selects an agricultural data set, where each item in the data set is described by an item description phrase in a set of item description phrases. For example, FIG. 3A illustrates a set of item description phrases of 'seeds/acre' and 'area'.

At block 504, the system processes, using a NLP model, (a) a set of canonical phrases and (b) the set of item description phrases, to generate a similarity measure between each item description phrase and each canonical phrase. In some implementations, the NLP model can include a variety of natural language models including a recurrent neural network model a bi-directional long short term memory network, a transformer model, a bidirectional encoder representations from transformer (BERT) model, one or more additional or alternative models, and/or a combination thereof.

At block 506, the system generates a bipartite graph based on (a) the set of canonical phrases, (b) the set of item description phrases, and (c) the similarity measures between each item description phrase and each canonical phrase. In some implementations, each item description phrase in the set of item description phrases can map to each canonical phrase in the set of canonical phrases. For example, the system can generate bipartite graph 300 of FIG. 3A.

At block 508, the system generates, based on the bipartite graph, a mapping between the set of canonical phrases and the set of item description phrases. In some implementations, the mapping can be generated by optimizing the bipartite graph. For example, the optimized bipartite graph 350 of FIG. 3B illustrates a mapping between a set of item description phrases and a set of canonical phrases based on bipartite graph 300 of FIG. 3A. In some implementations, the mapping can be implemented by globally optimizing the bipartite graph using, for example a bipartite graph perfect match process, the Hopcroft-Karp algorithm, the Hungarian algorithm,, one or more additional or alternative graph optimization processes, and/or combinations thereof.

Once the mappings and/or unified data set is established, these unified data may be used for a variety of purposes. For example, unified data from across numerous different agricultural entities, such as farms, co-ops, universities, governmental agencies, etc., may be used to train and/or apply machine learning models to perform tasks such as crop yield prediction, crop yield diagnosis, etc. For example, the same plant fungus may be described using different phrases by different agricultural entities. Once these phrases are mapped to the canonical phrases as described herein, it is possible to analyze all the agricultural entities' data collectively to make more informed inferences about, for instance, a likely effect of the fungus on crop yields across the marketplace (which could in turn be used for purposes of crop pricing). As another example, pure crop yields determined across a market from data that is normalized as described herein can be used, for instance, to help individual agricultural entities plan crop harvests, crop rotations, how much of their land to dedicate to particular crops, how much pesticide/fertilizer/herbicide to invest in, etc.

Although implementations are described herein with respect to an agricultural data set, additional or alternative types of data may be used in accordance with some implementations. For example, a unified data set may be generated based on several culinary data sets, several educational data sets, several manufacturing data sets, and/or several additional or alternative data sets.

Figure 6:
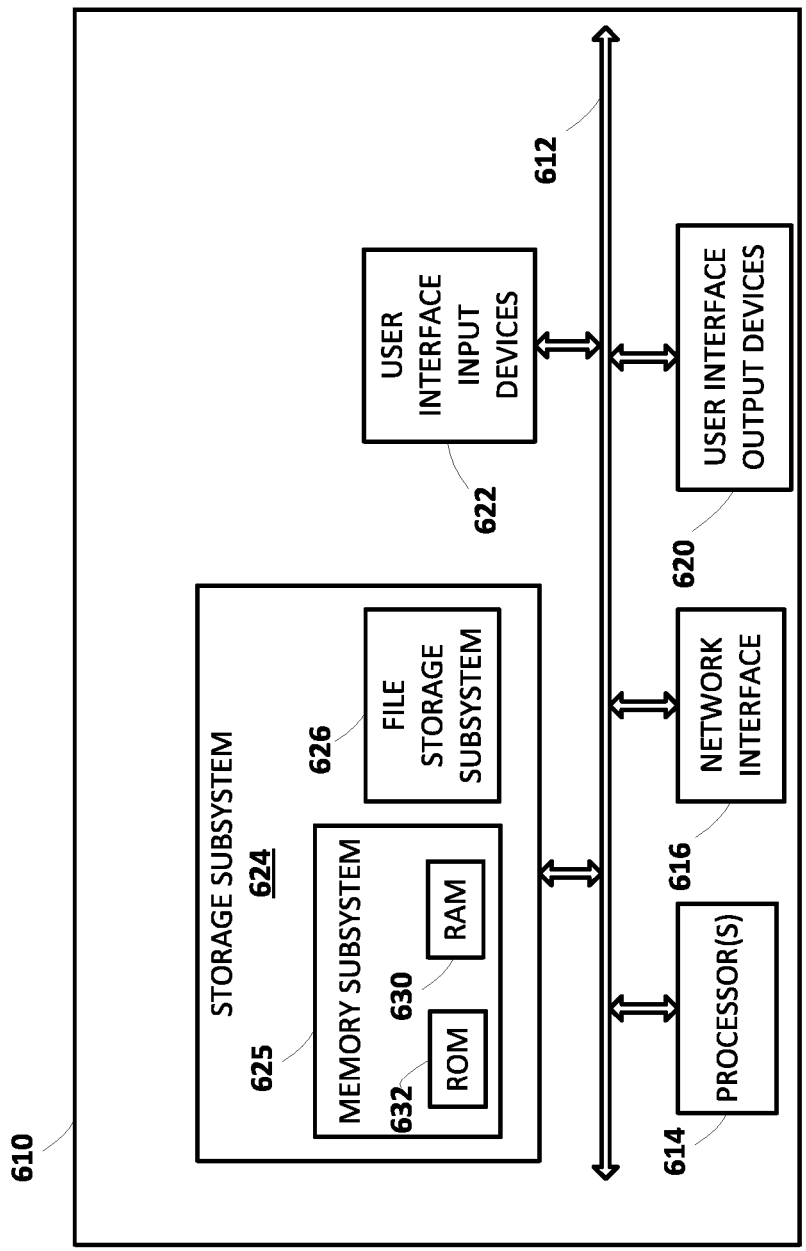
FIG. 6 illustrates an example architecture of a computing device.

FIG. 6 is a block diagram of an example computing device 610 that may optionally be utilized to perform one or more aspects of techniques described herein. In some implementations, one or more of a client computing device, and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of one or more of the processes of FIG. 4 and/or FIG. 5, as well as to implement various components depicted in FIG. 2.

These software modules are generally executed by processor 614 alone or in combination with other processors. Memory 625 used in the storage subsystem 624 can include a number of memories including a main random access memory ("RAM") 630 for storage of instructions and data during program execution and a read only memory ("ROM") 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, the method including, with a natural language processing ("NLP") model, processing (a) a set of canonical phrases and (b) a set of item description phrases in an agricultural data set, where each item in the agricultural data set is described by an item description phrase in the set of item description phrases, wherein the processing generates a similarity measure between each item description phrase in the set of item description phrases, and each canonical phrase in the set of canonical phrases. The method further includes generating a bipartite graph based on (a) the set of item description phrases, (b) the set of canonical phrases, and (c) the similarity measure between each item description phrase and each canonical phrase. The method further includes generating a mapping between the set of canonical phrases and the set of item description phrases based on the bipartite graph.

These and other implementations of the technology disclosed herein can include one or more of the following features.

In some implementations, the NLP model is a transformer model. In some versions of those implementations, the transformer model is a Bidirectional Encoder Representations from Transformers model.

In some implementations, the NLP model is a bi-directional long short-term memory ("LSTM") network.

In some implementations, generating the bipartite graph based on (a) the set of item description phrases, (b) the set of canonical phrases, and (c) the similarity measure between each item description phrase and each canonical phrase includes generating the bipartite graph where the set of item description phrases is a first set of vertices, the canonical phrases is a second set of vertices, and where a weight of an edge between each item description phrase and each canonical phrase is the corresponding similarity measure between the item description phrase and the canonical phrase. In some versions of those implementations, generating the mapping between the set of canonical phrases and the set of item description phrases based on the bipartite graph includes globally optimizing the bipartite graph. In some versions of those implementations, globally optimizing the bipartite graph includes globally optimizing the bipartite graph by processing the bipartite graph using a bipartite graph perfect match process, the Hungarian algorithm, or the Hopcroft-Karp algorithm.

In some implementations, the method further includes, with the NLP model, processing (a) the set of canonical phrases and (b) a set additional of item description phrases in an additional agricultural data set, where each item in the additional agricultural data set is described by an additional item description phrase in the set of additional item description phrases, to generate an additional similarity measure between each additional item description phrase in the set of additional item description phrases, and each canonical phrase in the set of canonical phrases. In some of those implementations, the method further includes generating an additional bipartite graph based on (a) the set of additional item description phrases, (b) the set of canonical phrases, and (c) the additional similarity measure between each item description phrase and each canonical phrase. In some implementations, the method further includes generating an additional mapping from the set of canonical phrases to the set of additional item description phrases based on the additional bipartite graph.

In some implementations, the agricultural data set is a third party agricultural data set, and the method further includes onboarding the agricultural data set to a database that is indexed by the set of canonical phrases based on the mapping.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the methods described herein. Some implementations also include one or more transitory or non-transitory computer readable storage media storing computer instructions executable by one or more processors to perform any of the methods described herein.

What is claimed is:

1. A method implemented by one or more processors, the method comprising:
    with a Bidirectional Encoder Representation of Transformers ("BERT") natural language processing ("NLP") model, processing (a) a set of canonical phrases and (b) a set of item description phrases in an agricultural data set, where each item in the agricultural data set is described by an item description phrase in the set of item description phrases,
  wherein the processing generates a similarity measure between each item description phrase in the set of item description phrases, and each canonical phrase in the set of canonical phrases;
generating a bipartite graph based on (a) the set of item description phrases, (b) the set of canonical phrases, and (c) the similarity measure between each item description phrase and each canonical phrase;
generating a mapping between the set of canonical phrases and the set of item description phrases based on the bipartite graph,
  wherein the mapping between each item description phrase and the corresponding canonical phrase is based on comparing the edge value, of each edge between the corresponding item description vertex and each of the canonical phrase vertices, and
  wherein the mapping between each item description phrase and the corresponding canonical phrase is automatically generated to combine the agricultural data set with an additional agricultural data set;
with the BERT NLP model, processing (a) the set of canonical phrases and (b) a set additional of additional item description phrases in the additional agricultural data set, where each item in the additional agricultural data set is described by an additional item description phrase in the set of additional item description phrases, to generate an additional similarity measure between each additional item description phrase in the set of item description phrases, and each canonical phrase in the set of canonical phrases;
generating an additional bipartite graph based on (a) the set of additional item description phrases, (b) the set of canonical phrases, and (c) the additional similarity measure between each item description phrase and each canonical phrase;
generating an additional mapping from the set of canonical phrases to the set of additional item description phrases based on the additional bipartite graph,
  wherein the mapping between each item description phrase and the corresponding canonical phrase is automatically generated to combine the agricultural data set with the additional agricultural data set;
generating a unified agricultural data set based on (a) the set of canonical phrases, (b) the mapping corresponding to the agricultural data set, and (c) the additional mapping corresponding to the additional agricultural data set;
training a crop yield model based on the agricultural data set, the additional agricultural data set, the mapping, and the additional mapping; and
generating a predicted crop yield for a crop captured in the agricultural data set and/or the additional agricultural data set based on processing the unified agricultural data set using the trained crop yield prediction model.

2. The method of claim 1, wherein generating the bipartite graph based on (a) the set of item description phrases, (b) the set of canonical phrases, and (c) the similarity measure between each item description phrase and each canonical phrase comprises:
  generating the bipartite graph where the set of item description phrases is a first set of vertices, the canonical phrases is a second set of vertices, and where a weight of an edge between each item description phrase and each canonical phrase is the corresponding similarity measure between the item description phrase and the canonical phrase.

3. The method of claim 2, wherein generating the mapping between the set of canonical phrases and the set of item description phrases based on the bipartite graph comprises globally optimizing the bipartite graph.

4. The method of claim 3, wherein globally optimizing the bipartite graph comprises:
  globally optimizing the bipartite graph by processing the bipartite graph using a bipartite graph perfect match process, a Hungarian algorithm, or a Hopcroft-Karp algorithm.

5. The method of claim 1, wherein the agricultural data set is a third party agricultural data set, and the method further comprises onboarding the agricultural data set to a database that is indexed by the set of canonical phrases based on the mapping.

6. The method of claim 1, wherein the agricultural data set includes data captured from a first farm in an agricultural marketplace, wherein the additional data set includes data captured from a second farm in the agricultural marketplace, and wherein the predicted crop yield generated based on the unified agricultural data set is a predicted crop yield for the agricultural marketplace.

7. The method of claim 6, further comprising:
  processing the predicted crop yield for the agricultural marketplace to plan a crop harvest of the first farm.

8. The method of claim 1, wherein generating the unified agricultural data set based on (a) the set of canonical phrases, (b) the bipartite graph corresponding to the agricultural data set, and (c) the additional bipartite graph corresponding to the additional agricultural data set comprises:
  determining whether the mapping between the set of canonical phrases and the set of item description phrases based on the bipartite graph satisfies a threshold confidence value;
  determining whether the additional mapping between the set of canonical phrases and the additional item description phrases based on the additional bipartite graph satisfies the threshold confidence value;
  in response to determining the mapping between the set of canonical phrases and the set of item description phrases based on the bipartite graph satisfies the threshold confidence value and in response to determining the additional mapping between the set of canonical phrases and the additional item description phrases based on the additional bipartite graph satisfies the threshold confidence value:
  generating the unified agricultural data set based on (a) the set of canonical phrases, (b) the bipartite graph corresponding to the agricultural data set, and (c) the additional bipartite graph corresponding to the additional agricultural data set.

9. A non-transitory computer-readable medium comprising instructions that when executed by one or more processors of a computing system, cause the computing system to perform a method of:
  with a Bidirectional Encoder Representation of Transformers ("BERT") natural language processing ("NLP") model, processing (a) a set of canonical phrases and (b) a set of item description phrases in an agricultural data set, where each item in the agricultural data set is described by an item description phrase in the set of item description phrases,
    wherein the processing generates a similarity measure between each item description phrase in the set of item description phrases, and each canonical phrase in the set of canonical phrases;
  generating a bipartite graph based on (a) the set of item description phrases, (b) the set of canonical phrases, and (c) the similarity measure between each item description phrase and each canonical phrase;

generating a mapping between the set of canonical phrases and the set of item description phrases based on the bipartite graph, wherein the mapping between each item description phrase and the corresponding canonical phrase is based on comparing the edge value, of each edge between the corresponding item description vertex and each of the canonical phrase vertices, and wherein the mapping between each item description phrase and the corresponding canonical phrase is automatically generated to combine the agricultural data set with an additional agricultural data set;

with the BERT NLP model, processing (a) the set of canonical phrases and (b) a set additional of additional item description phrases in the additional agricultural data set, where each item in the additional agricultural data set is described by an additional item description phrase in the set of additional item description phrases, to generate an additional similarity measure between each additional item description phrase in the set of item description phrases, and each canonical phrase in the set of canonical phrases;

generating an additional bipartite graph based on (a) the set of additional item description phrases, (b) the set of canonical phrases, and (c) the additional similarity measure between each item description phrase and each canonical phrase;

generating an additional mapping from the set of canonical phrases to the set of additional item description phrases based on the additional bipartite graph, wherein the mapping between each item description phrase and the corresponding canonical phrase is automatically generated to combine the agricultural data set with the additional agricultural data set;

generating a unified agricultural data set based on (a) the set of canonical phrases, (b) the mapping corresponding to the agricultural data set, and (c) the additional mapping corresponding to the additional agricultural data set;

training a crop yield model based on the agricultural data set, the additional agricultural data set, the mapping, and the additional mapping; and generating a predicted crop yield for a crop captured in the agricultural data set and/or the additional agricultural data set based on processing the unified agricultural data set using the trained crop yield prediction model.

10. The non-transitory computer-readable medium of claim 9, wherein generating the bipartite graph based on (a) the set of item description phrases, (b) the set of canonical phrases, and (c) the similarity measure between each item description phrase and each canonical phrase comprises:

generating the bipartite graph where the set of item description phrases is a first set of vertices, the canonical phrases is a second set of vertices, and where a weight of an edge between each item description phrase and each canonical phrase is the corresponding similarity measure between the item description phrase and the canonical phrase.

11. The non-transitory computer-readable medium of claim 10, wherein generating the mapping between the set of canonical phrases and the set of item description phrases based on the bipartite graph comprises globally optimizing the bipartite graph.

12. The non-transitory computer-readable medium of claim 11, wherein globally optimizing the bipartite graph comprises:

globally optimizing the bipartite graph by processing the bipartite graph using a bipartite graph perfect match process, a Hungarian algorithm, or a Hopcroft-Karp algorithm.

13. The non-transitory computer-readable medium of claim 9, wherein the agricultural data set is a third party agricultural data set, and the method further comprises onboarding the agricultural data set to a database that is indexed by the set of canonical phrases based on the mapping.

14. A system comprising one or more processors configured to perform the following operations:

with a Bidirectional Encoder Representation of Transformers ("BERT") natural language processing ("NLP") model, processing (a) a set of canonical phrases and (b) a set of item description phrases in an agricultural data set, where each item in the agricultural data set is described by an item description phrase in the set of item description phrases, wherein the processing generates a similarity measure between each item description phrase in the set of item description phrases, and each canonical phrase in the set of canonical phrases;

generating a bipartite graph based on (a) the set of item description phrases, (b) the set of canonical phrases, and (c) the similarity measure between each item description phrase and each canonical phrase;

generating a mapping between the set of canonical phrases and the set of item description phrases based on the bipartite graph, wherein the mapping between each item description phrase and the corresponding canonical phrase is based on comparing the edge value, of each edge between the corresponding item description vertex and each of the canonical phrase vertices, and wherein the mapping between each item description phrase and the corresponding canonical phrase is automatically generated to combine the agricultural data set with an additional agricultural data set;

with the BERT NLP model, processing (a) the set of canonical phrases and (b) a set additional of additional item description phrases in the additional agricultural data set, where each item in the additional agricultural data set is described by an additional item description phrase in the set of additional item description phrases, to generate an additional similarity measure between each additional item description phrase in the set of item description phrases, and each canonical phrase in the set of canonical phrases;

generating an additional bipartite graph based on (a) the set of additional item description phrases, (b) the set of canonical phrases, and (c) the additional similarity measure between each item description phrase and each canonical phrase;

generating an additional mapping from the set of canonical phrases to the set of additional item description phrases based on the additional bipartite graph, wherein the mapping between each item description phrase and the corresponding canonical phrase is automatically generated to combine the agricultural data set with the additional agricultural data set;

generating a unified agricultural data set based on (a) the set of canonical phrases, (b) the mapping corresponding to the agricultural data set, and (c) the additional mapping corresponding to the additional agricultural data set;

training a crop yield model based on the agricultural data set, the additional agricultural data set, the mapping, and the additional mapping; and generating a predicted crop yield for a crop captured in the agricultural data set and/or the additional agricultural data set based on processing the unified agricultural data set using the trained crop yield prediction model.

\* \* \* \* \*